United States Patent
Bibikar et al.

(10) Patent No.: US 9,235,712 B1
(45) Date of Patent: Jan. 12, 2016

(54) SECURING EXTERNAL MEMORY DATA (71) Applicant: Marvell International Ltd., Hamilton (BM)

(72) Inventors: Vasudev J. Bibikar, Austin, TX (US); Minda Zhang, Westford, MA (US); David Hawkins, Austin, TX (US); Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 115 days.

(21) Appl. No.: 14/029,506

(22) Filed: Sep. 17, 2013

Related U.S. Application Data (63) Continuation of application No. 12/749,228, filed on Mar. 29, 2010, now Pat. No. 8,555,082.

(60) Provisional application No. 61/165,603, filed on Apr. 1, 2009.

(51) Int. Cl.
| | |
|---|---|
| G06F 12/14 | (2006.01) |
| G06F 21/60 | (2013.01) |
| G06F 21/57 | (2013.01) |
| G09C 1/00 | (2006.01) |
| G06F 21/75 | (2013.01) |
| H04L 9/06 | (2006.01) |
| G06F 21/74 | (2013.01) |

(52) U.S. Cl.
CPC .......... G06F 21/602 (2013.01); G06F 12/1408 (2013.01); G06F 21/575 (2013.01); G06F 21/74 (2013.01); G06F 21/75 (2013.01); G09C 1/00 (2013.01); H04L 9/0618 (2013.01); *H04L 2209/12* (2013.01)

(58) Field of Classification Search
CPC .... G09C 1/00; H04L 9/0618; H04L 2209/12; G06F 21/575; G06F 21/74; G06F 21/75; G06F 12/1408
USPC ......................................................... 713/189
See application file for complete search history.

(56) References Cited

U.S. PATENT DOCUMENTS

| | | | |
|---|---|---|---|
| 2003/0152233 A1* | 8/2003 | Filippi .......................... | 380/277 |
| 2005/0210287 A1* | 9/2005 | Paatero ......................... | 713/201 |
| 2006/0080553 A1* | 4/2006 | Hall .............................. | 713/189 |
| 2006/0265563 A1* | 11/2006 | Goettfert et al. .............. | 711/164 |

* cited by examiner

*Primary Examiner* — William Goodchild (57) ABSTRACT

The present disclosure includes apparatus, systems, digital logic circuitry and techniques relating to data encoding. A method performed by a system on a chip (SOC) includes receiving data to be output to a memory unit external to the SOC. Also a key for scrambling the received data is received. A proper subset of the key is identified and used to scramble the received data. The scrambled data is output to the memory unit external to the SOC.

20 Claims, 8 Drawing Sheets

SECURING EXTERNAL MEMORY DATA

CROSS REFERENCE TO RELATED APPLICATIONS

This disclosure is a continuation application (and claims the benefit of priority under 35 USC 120) of U.S. application Ser. No. 12/749,228, filed Mar. 29, 2010, entitled "SECURING EXTERNAL MEMORY DATA", now U.S. Pat. No. 8,555,082, which claims the benefit of the priority of U.S. Provisional Application Ser. No. 61/165,603, filed Apr. 1, 2009 and entitled "A METHOD AND APPARATUS OF ENCRYPTING OF EXTERNAL MEMORY DATA TO PROVIDE A ROBUST SECURITY ENVIRONMENT"; both of these prior applications are incorporated by reference.

BACKGROUND

The present disclosure describes systems, apparatus and techniques relating to data encryption technology.

In conventional system on a chip (SOC) implementations, the data seen on the external bus is the actual non-encrypted data from the data source, which data source is typically a processor that is present in the SOC. While the SOC may include an on-chip encryption engine to perform standard encryption algorithms, such as Advanced Encryption Standard (AES), Data Encryption Standard (DES), ElGamal encryption and Rivest, Shamir and Adleman (RSA) encryption, data transferred outside the chip boundary of the SOC is typically not encrypted because the standard encryption algorithms add latency for each data transfer. A hacker can potentially observe the non-encrypted data flowing on external pins of a processor or SOC and may be able to understand the inner workings of the security software or even steal valuable information.

SUMMARY

The present disclosure includes apparatus, systems, digital logic circuitry and techniques relating to data encoding algorithms. A secure module within a chip can be used to provide secure data transfer to an external device. According to an aspect of the described apparatus, systems and digital logic circuitry, a method includes performed by a system on a chip (SOC) includes receiving data to be output to a memory unit external to the SOC. Also a key for scrambling the received data is received. A proper subset of the key is identified. The received data is scrambled using the identified proper subset of the key. Additionally, the scrambled data is output to the memory unit external to the SOC.

Implementations can optionally include one or more of the following features. Address information associated with the received data can also be received, and the proper subset of the key can be identified based on a number of bits of address information associated with the received data. A rotate-bit that indicates whether to reverse an order of bits of the key can be generated. When the rotate-bit indicates reversing the order of bits of the key, the order of bits of the proper subset of the key identified by the pointer can be reversed. Scrambling the received data can include scrambling the received data using the identified proper subset of the key with the order of the bits reversed. The scrambled data stored at the memory unit external to the SOC can be read; and the read scrambled data can be descrambled using a corresponding proper subset of the key used to obtain the scrambled data. The key can include an encryption key generated during a boot sequence and stored at a secure area of the SOC not accessible by non-secure components of the SOC. Also, the encryption key can be generated based on an encryption standard including one of Advanced Encryption Standard (AES), Data Encryption Standard (DES), ElGamal encryption and Rivest, Shamir and Adleman (RSA) encryption. The key can include a randomly generated key independent of an encryption standard.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described apparatus, systems and techniques can result in one or more of the following advantages. Within an SOC, an existing on-chip encryption engine can generate a new encryption key upon each boot sequence. The generated encryption key can be used to encrypt internal data during various secure transactions. In addition, the same (or a second) encryption key can be used to scramble the data to be output to an external memory unit. Scrambling is a lightweight encoding, in contrast to encryption, which is a heavyweight encoding. Because scrambling uses less data processing than encoding, scrambling incurs less latency than encryption. Also, the key used to encrypt the data need not be a standard encryption key generated based on an encryption standard, such as AES or RSA. Rather, any randomly generated key (e.g., 128 or 256 bits) can be used. Also, the key used to scramble the data can be stored in a secure area of a SOC not accessible by any of the non-secure components, such as the core processor. Because the key used to scramble the data is not accessible by the non-secure components, the security of the encryption key can be maintained. Moreover, during a given transaction, address information from the data to be scrambled can be used to dynamically scramble the data using different portions of the key. By using different bits of the address information, the portion of the key used can be changed to further increase the security of the encoding. Using the encoding techniques described in this specification, the security of the data can be extended beyond a chip boundary of the SOC.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

The systems, apparatus and techniques described herein can be implemented as one or more devices, such as one or more integrated circuit (IC) devices (e.g., computing devices, such as a mobile netbook, a PDA, a smart phone, a desktop computer, a server, a laptop, etc.) For example, the systems, apparatus and techniques described in this specification can be implemented to perform data encoding (e.g., scrambling) to provide a robust security environment.

Figure 1:
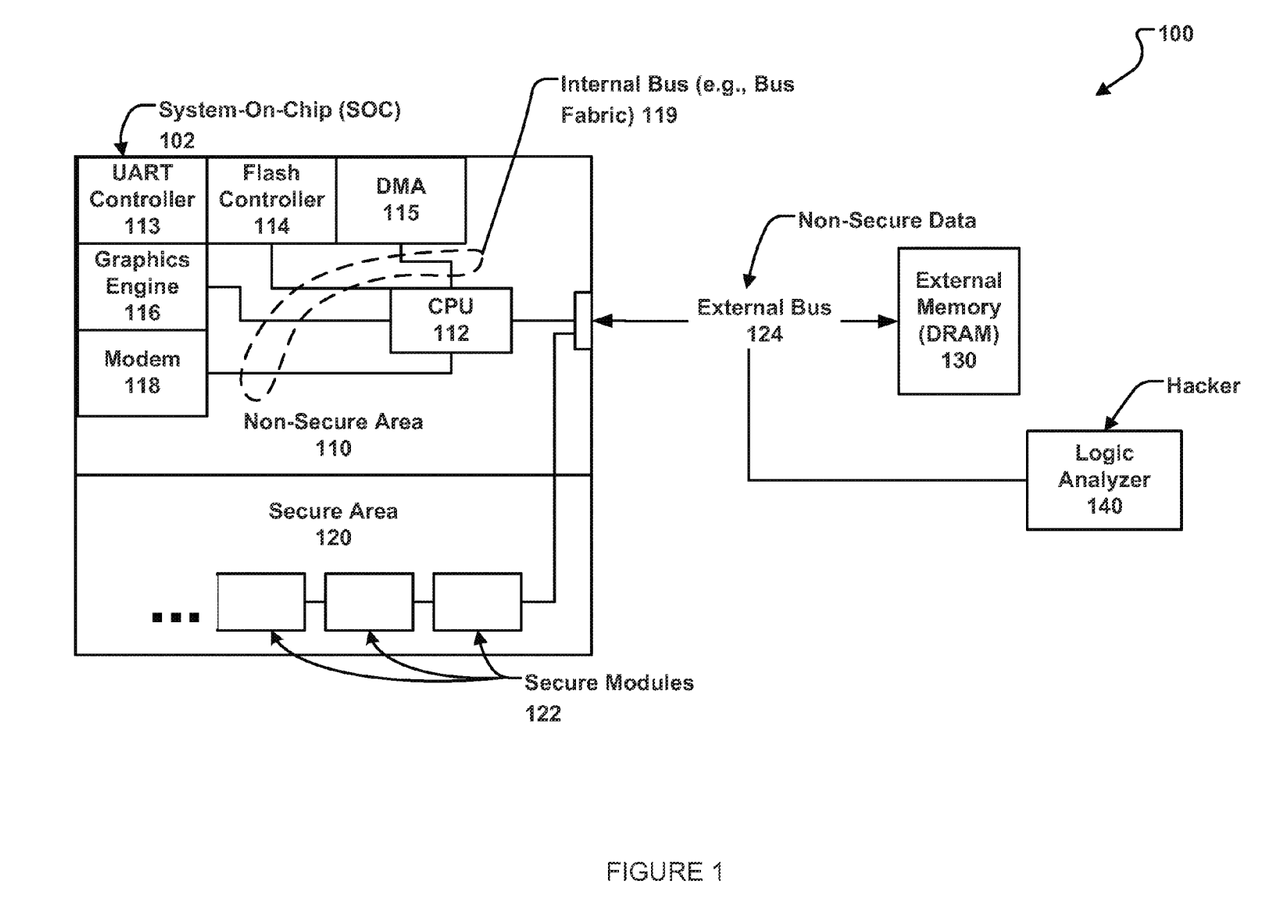
FIG. 1 is a block diagram showing an exemplary system for performing data transfers between a system on a chip (SOC) and an external memory unit.

FIG. 1 is a block diagram showing an exemplary system 100 for performing data transfers between a system on a chip (SOC) 102 and an external memory unit 130. The SOC 102 includes a secure area 120 and a non-secure area 110. The non-secure area 110 can include a core processor or CPU 112 and multiple application peripherals or modules, such as a Universal Asynchronous Receiver/Transmitter (UART) controller 113, a flash controller 114, a direct memory access (DMA) unit 115, a graphics engine 116, a modem 118, etc. The CPU 112 connects to the application peripherals through an internal bus 119 that can be implemented as a bus fabric. The internal bus 119 can be a mesh of interconnects that resembles cloth fabric. The non-secure area 110 of the SOC is not secure because the core processor 112 has access (e.g., direct connection through the internal bus 119) to the application peripherals (e.g., a UART (Universal Asynchronous Receiver/Transmitter) controller, a memory controller, or other on-chip process that the core processor is connected to).

The secure area 120 includes various secure modules 122 that perform secure transactions to maintain certain data secure within the boundary of the SOC. The security of the data within the secure area 120 can be maintained because the core processor 112 does not have access (no direct connections) to the secure modules 122. By using the secure area, the data within the chip boundary of the SOC can be maintained. However, when the SOC 102 exchanges data with an external memory 130 over an external bus 124, the data flowing over the external bus 124 may become vulnerable to attack by a hacker using a logic analyzer 140. To secure data exchanged between a SOC and an external memory, a combination of static and dynamic encoding techniques can be used to scramble the exchanged data.

As described below, astatic encoding technique can include using a single static key generated during an operational period of an SOC. A new key can be generated at each boot sequence to replace the previous key generated during a previous boot sequence. Rather than generate a new key for each encoding transaction, the same key generated at boot sequence can be used for all encoding transactions until the next boot sequence. By using the single static key during each operational period, the processing time (e.g., hardware resource allocation costs) associated with generating a new key can be reduced. Reducing the processing time to generate a new key can reduce latency related to data transfer between the SOC and an external memory unit.

A dynamic encoding technique can be combined with the static encoding technique to add a level of security to the overall data encoding process. The dynamic encoding technique can include dynamically generating a pointer for corresponding data to be outputted to an external memory unit. The dynamically generated pointer can identify at least a portion of the static key to use in encoding the data. The pointer can point to the entire key or a proper subset of the key. For example, the pointer can be dynamically generated based on the address information of the data to be outputted to the external memory unit. The pointer can be generated using the entire address information or a proper subset of the address information. Because different data will have different address information, a unique pointer can be dynamically generated for the corresponding data.

Figure 2:
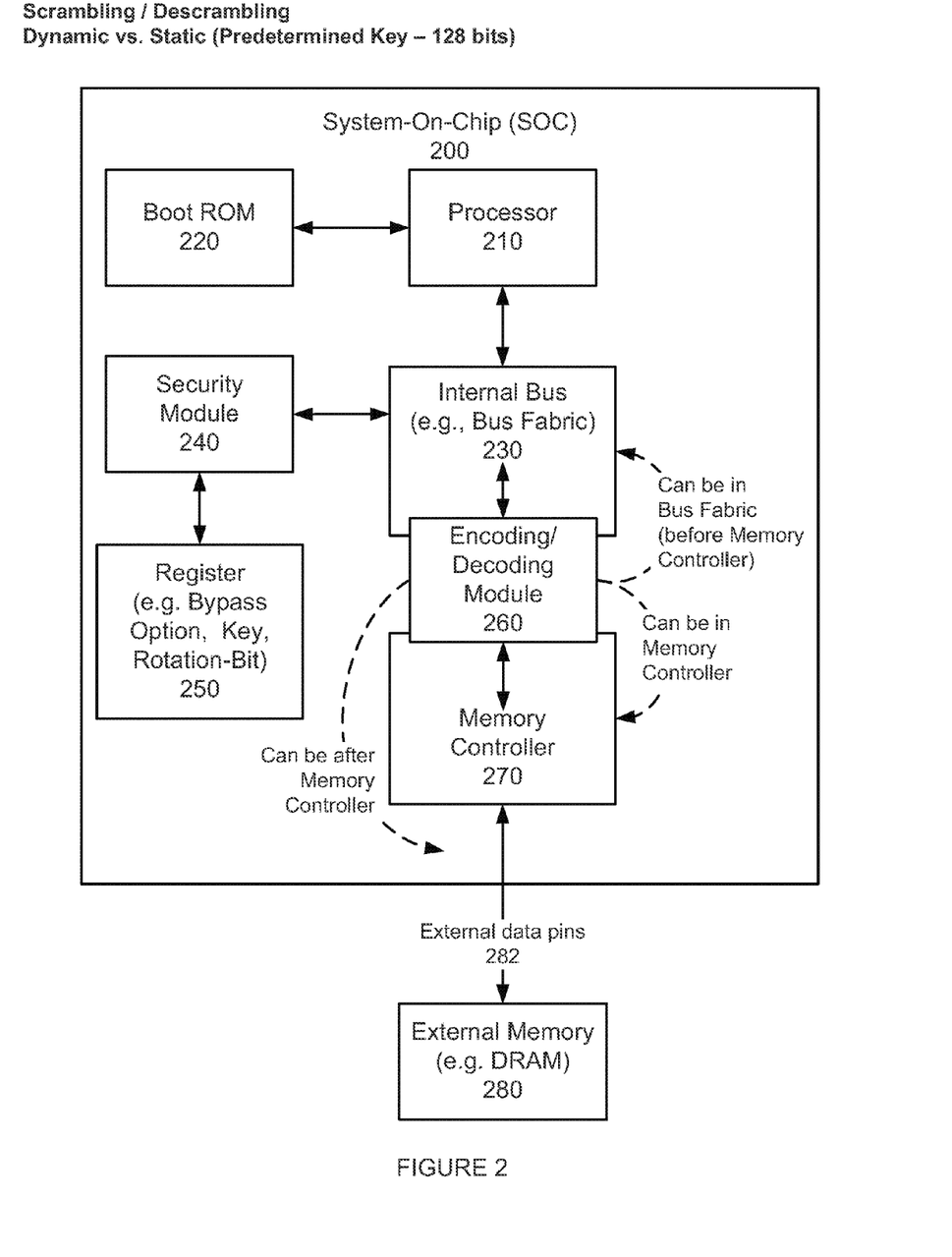
FIG. 2 is a block diagram showing an exemplary system on a chip (SOC) for encoding-decoding external memory data as described in this specification.

FIG. 2 is a block diagram showing an exemplary system on a chip (SOC) for encoding and decoding external memory data as described in this specification. The SOC 200 can include various hardware components, such as a processor 210, a boot read-only-memory (ROM) 220, an internal bus 230 that can be implemented as a bus fabric, a security module 240, a register module 250, an encoding-decoding module 260 and a memory controller 270. Using the memory controller 270, the processor 210 can communicate with an external memory module 280, such as a dynamic random access memory (DRAM), to send and receive data to and from the external memory module 280. The encoded data sent or outputted to the external memory module 280 can be represented as write data (Wdata), and the encoded data received from the external memory module 280 can be represented as read data (Rdata). Outputting the encoded Wdata to the external memory module 280 can include outputting the encoded Wdata to the external bus and storing the encoded Wdata at the external memory module 280.

The encoding-decoding module 260 can encode the Wdata presented by the processor 210 to the memory controller 270 in the memory controller 270 or in the internal bus 230 that connects the processor 210 to the memory controller 270. Encoding the Wdata can include data scrambling. Data scrambling is a light-weight encoding, in contrast to encryption, which is a heavy-weight encoding algorithm. Because scrambling uses less data processing than an encryption algorithm such as AES, DES or RSA, scrambling can reduce latency compared to encryption. For example, the encoding-decoding module 260 can be included in the memory controller 270 to scramble the Wdata in the memory controller. Additionally, the encoding-decoding module 260 can be included in the internal bus 230 to scramble the Wdata in the internal bus 230. In addition, the encoding-decoding module 260 can be placed before the memory controller 170 or after the memory controller.

For the return data from the external memory module 280, the encoding-decoding module 260 can decode the encoded Rdata received or read from the external memory 280. The Rdata read from the external memory 280 can be decoded so as to prevent the processor 210 or any other system resource in the SOC from knowing that Rdata was initially encoded. Because the encoding-decoding module 260 encodes the Wdata and decodes the Rdata within the SOC, the external pins 282 of the external memory communicate the encoded data and not the unencoded or decoded data.

The encoding-decoding module 260 can be implemented in the internal bus 230 or in the memory controller 270 such that no additional latency is incurred for data transfers beyond the first transfer. For high speed implementations, while the latency due to the first data transfer may be affected by the initial generation of the static key, subsequent data transfers do not incurring any penalty for latency. Thus, beyond the first data transfer, subsequent data transfers do not add any additional latency.

Figure 3:
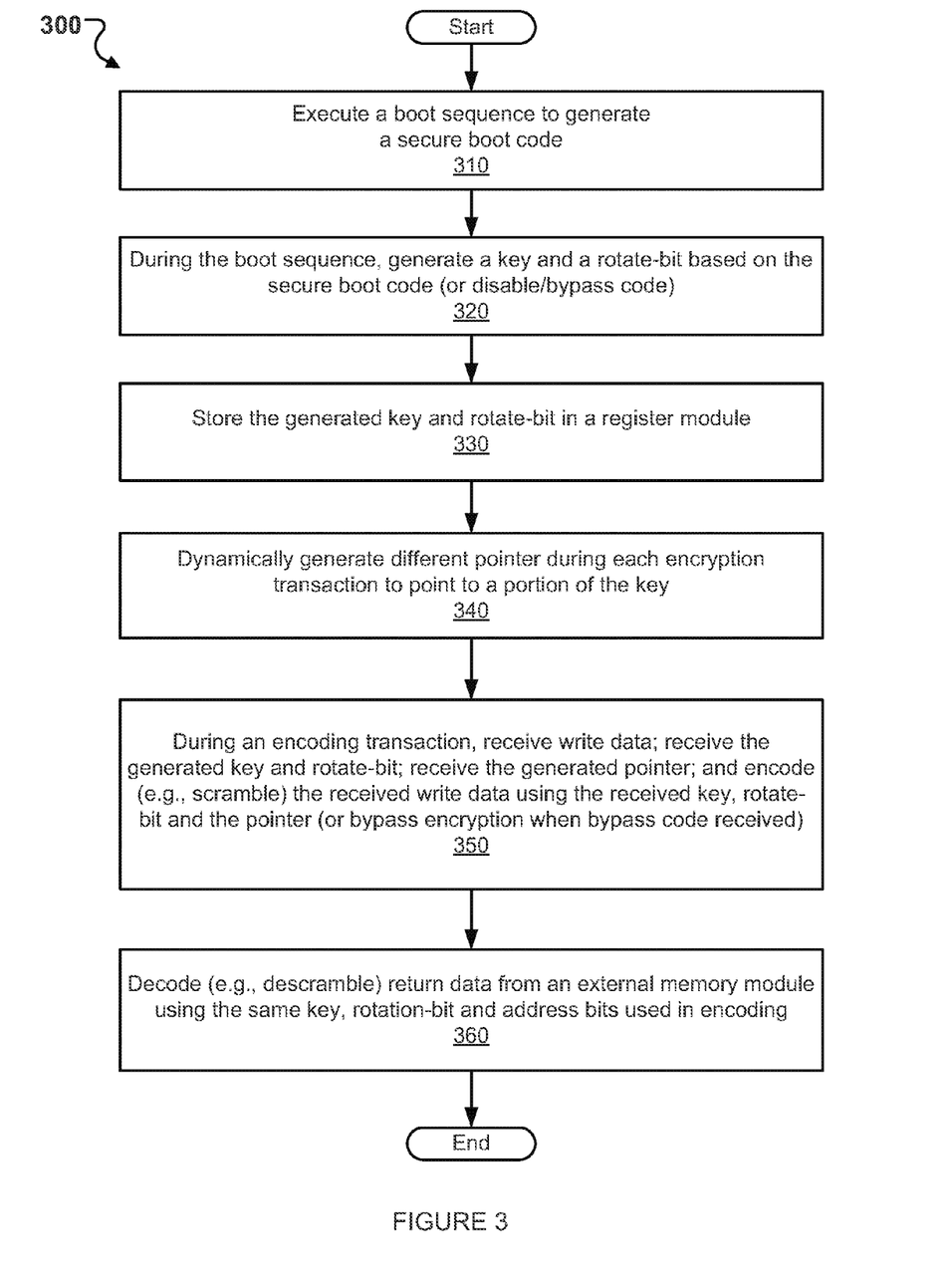
FIG. 3 is a process flow diagram showing an exemplary process for encoding-decoding external memory data.
Figure 4:
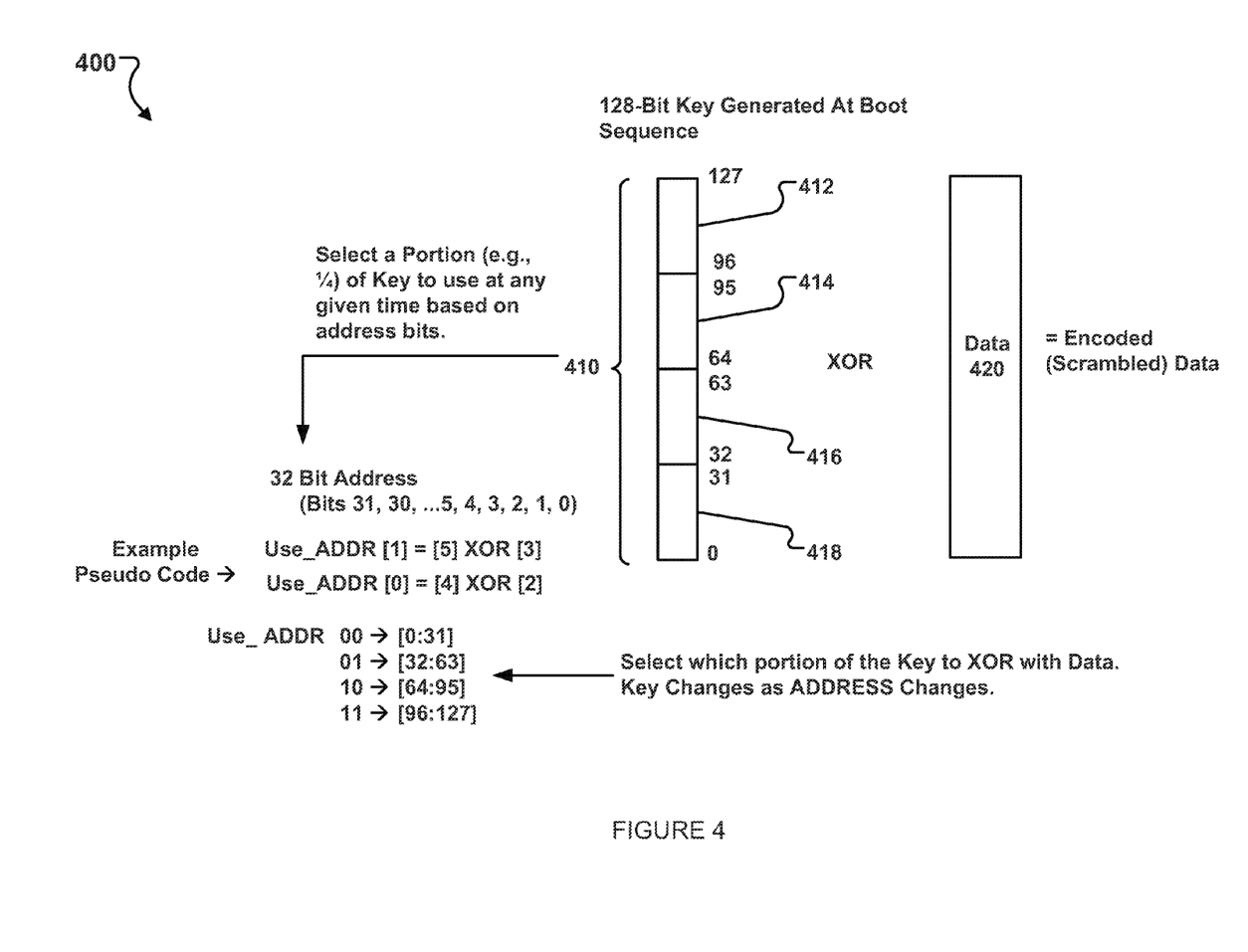
FIG. 4 is a diagram showing a process of using address bits to select a portion of a key to encode write data.
Figure 5:
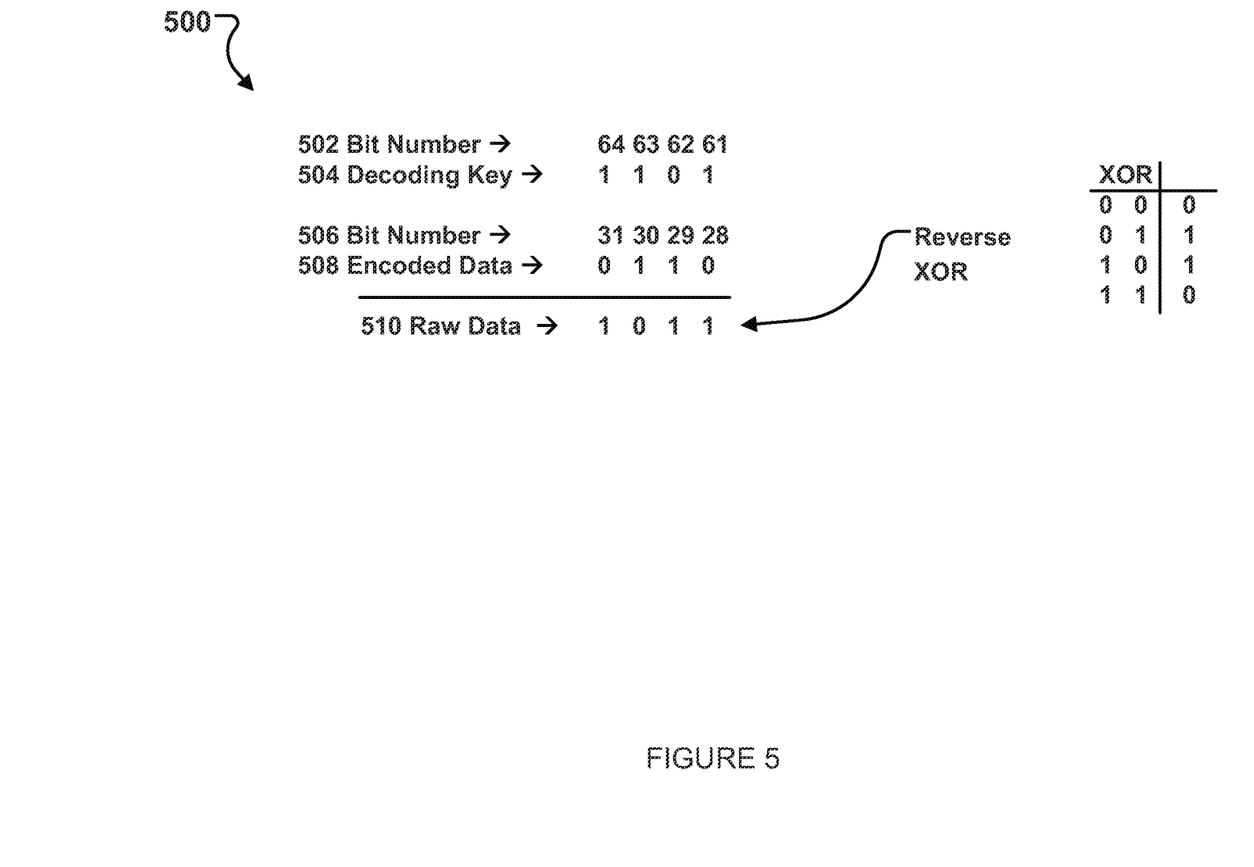
FIG. 5 is a diagram showing a process of encoding-decoding read data.

FIGS. 3, 4 and 5 describe an exemplary encoding-decoding process. The described encoding-decoding process includes generating a key based on a symmetric-key algorithm to scramble and descramble the write and read data. A symmetric-key algorithm uses the same secret key to encode the write data and decode the read data. Examples of symmetric-key algorithm can include AES and DES. Because the SOC performs both the encoding and decoding of data, the secret key can be maintained at a secure location of the SOC without needing to send the secret key to an external component.

In addition, keys can be generated using other encoding algorithms. For example, an asymmetric-key algorithm uses a public key to scramble the data and a separate private key to descramble the data. Examples of asymmetric algorithms can include ElGamal encryption and Rivest, Shamir and Adleman (RSA) encryption. Also, a randomly generated key, independent of a standard encryption algorithm can be used.

FIG. 3 is a process flow diagram 300 showing an exemplary process for encoding and decoding external memory data. A SOC (e.g., SOC 200) can encode write data presented from a processor (e.g., processor 210) to a memory controller (e.g., memory controller 270) within the SOC. The encoded write data is written to an external memory 280 by the memory controller 270. Encoding the write data can include scrambling the write data using a combination of static and dynamic encoding techniques.

At 310, the processor can execute a boot sequence stored in a boot ROM (e.g., boot ROM 220) to generate a secure boot code. The boot sequence can be executed under various conditions, such as when reset is de-asserted. The secure boot code can indicate secure boot parameters, such as a key and a rotate-bit used to encode data, such as data scrambling. The key generated can be any number of bits from 1 to 256-bits, for example. For illustrative purposes, a 128-bit key is used in the descriptions below. The generated key can be based on a standard encryption algorithm, such as AES, DES or RSA. A standards-based encryption key can be generated by an on-chip encryption module within the SOC. Also, the generated key can be a randomly generated key independent of a standard encryption algorithm. A randomly generated key can be generated using a separate key-generating module or the encoding-decoding module within the SOC. Because generating the standards-based encryption key using the on-chip encryption engine is a part of a normal boot sequence, no additional hardware is needed to generate the key. In other words, the encoding-decoding process can use this pre-existing encryption key or the existing hardware can be used to generate a second key.

The rotate-bit can include a flag that indicates whether the bits of the key should be rotated. Rotating the bits represents reversing the order of the bits. For example, rotating the bits 0, 1, 2, 3 . . . 127 of a 128-bit key, can result in bits being reordered from bit 127 to bit 0. The secure boot code can also indicate an option to disable or bypass (e.g., using a disable or bypass code) the encoding-decoding operation for debugging purposes, for example.

At 320, during the boot sequence, a security module (e.g. security module 240) within the SOC 200 can generate a key (e.g., a 128-bit key) and a rotate-bit based on the secure boot code. The security module can include a pre-existing on-chip encryption engine or a separate key-generating module. During each boot sequence, a new encryption key is generated. Because a new key is generated once during the boot sequence, use of the boot sequence generated key can be considered as static encoding technique. Additionally, the security module can generate a disable or bypass code, rather than the key and the rotate-bit, to indicate that the encoding-decoding module should be disabled or, bypassed. Moreover, the security module can generate other keys for performing other secure transactions within the secure area of the SOC.

At 330, the generated key (e.g., 128-bit key) and rotate-bit can be stored in a register module (e.g., register module 250). The register module can include one or more registers. For example, the 128-bit key and the rotate option can be stored in separate registers. The register module and the stored contents, including the key, are not accessible by the core processor 210. Because the key is not accessible by the core processor 210, the security of the key can be maintained. The 128-bit key and the rotate-bit should be generated before the SOC can access an external memory (e.g., external memory 280). The 128-bit key and the rotate-bit generated during the boot sequence are available to be used during each encoding transaction.

At 340, the security module can dynamically perform data encoding using the address information of the write data during each encoding transaction. Different number of bits of the address information can be used to dynamically generate a use_address (e.g. a pointer), which can be used to access a portion (e.g., a proper subset) of the encryption key. For a 32-bit address, for example, four of the bits can be used to perform scrambling operations, such as digital logic operations to generate a two-bit use_address that points to or identifies different portions of the generated key. Examples of digital logic operations can include exclusive-or (XOR) operations. For example, during a given scrambling transaction, the use_address pointer can point to any ¼ portion of the 128-bit key. The dynamically generated use_address pointer can be stored in a register module (e.g., register 250) and available to be used during the encoding transaction. Also, the generated use_address pointer can be sent directly to an encoding-decoding module to encode a given write data. The pointer can be dynamically generated for a corresponding write data using information other than the address of the write data.

In some implementations, rather than using the address information, additional information can be stored with the data in the external memory (e.g., DRAM). Additionally, static data can be used to generate the use_address pointer at boot-up or reset. This static data could be obtained using a random number generator or the time of boot-up, etc.

At 350, during a given encoding transaction, an encoding-decoding module (e.g., encoding-decoding module 260) can receive a given write data from the processor; receive the generated 128-bit key and rotate-bit from a register module (e.g., the register module 250); receive the generated use_address pointer; and encode the received write data using the received 128-bit key, rotate-bit and the use_address pointer. The portion of the 128-bit indicated by the use_address pointer can be used to encode (e.g., scramble) the write data using a scrambling (e.g., XOR) algorithm. The encoding process (e.g., data scrambling) is described further with respect to FIG. 4 below. When a disable/bypass code is received, the encoding transaction is bypassed to perform a debugging process.

At 360, the return data from the external memory module can be decoded using the same 128-bit key, rotate-bit and use_address pointer used to encode (e.g., scramble) the data. The same portion of the 128-bit key identified by the use_address pointer (also, using a rotation if indicated by the rotate-bit) is used to perform an inverse of the scrambling operation (e.g., inverse XOR) with the encoded data. The process of decoding the encoded data from the external memory is described further with respect to FIG. 5 below.

In some implementations, in addition to normal data transfers as described above, the memory controller 270 can use the internal bus 230 for other communications, such as device register accesses or commands. Then, the SOC 200 can selectively encode (e.g., scramble and/or descramble) the normal data transfers but not the other communications. To perform selective encoding, the encoding-decoding module can be placed inside the memory controller 270.

FIG. 4 is a diagram showing a process 400 of using a dynamically generated pointer, such as address bits to select a portion of a 128-bit encryption key to encode (e.g., scramble) the write data. All of the address bits or a proper subset of the address bits can be used to select a proper subset of the generated key. As described above, encoding can be a function of parameters identified by a secure boot code during the boot sequence and a run-time parameter dynamically evaluated on each data transfer transaction. The secure boot parameters can include a 128-bit key (e.g., encryption_key [0:127]) and a rotate-bit that provides an option to rotate (e.g., reverse the order of) the bits of the encryption key. The run-time parameter can include different number (e.g., address bits [3:2]) of the address information of the write or read data 420.

As described above, a new key (e.g., a new 128-bit key) 410 is generated during a given boot sequence. Data encoding (e.g., data scrambling) can be performed without having the processor 210 access the generated 128-bit encryption key.

The 128-bit key 410 can be grouped into multiple portions, and a use_address pointer generated using different number of bits of the address can be used to identify one of the multiple portions of the key. For example, the pointer generated based on the address bits can be used to identify a ¼ of the encryption key at any given time. FIG. 4 shows the 128-bit key 410 grouped into four portions or proper subsets of 32-bits each. A first portion 418 can include bits 0-31. A second portion 416 can include bits 32-63. A third portion 414 can include bits 64-95. A fourth portion 412 can include bits 96-127. One of the four portions can be selected based on the use_address pointer generated using the address bits. As the address bits change, the pointer changes and the portion of the key identified by the pointer changes. Given a 32-bit address, examples of pseudo code equations for using different address bits can include the following:

use_address[1]=address[5] XOR address[3]
use_address[0]=address[4] XOR address[2].

Thus, in the example described above, the bits 5, 4, 3 and 2 are used to perform two XOR operations to obtain two bits of a use-address pointer. The first bit (use_address [0]) of the use_address can be obtained by performing XOR of bits [4] and [2] of the address. The second bit (use_address [1]) of the use_address can be obtained by performing XOR of bits [5] and [3]. The use of bits [5], [4], [3] and [2] is described for illustrative purposes only and other equations can be implemented to use other bits (different number of bits and/or different bits) of the address.

Different use_address bits can point to different portions of the encryption key. For example, as shown in FIG. 3, use_address (ADDR) of "00" can represent bits 0-31 of the key. ADDR of "01" can represent bits 32-63 of the key. ADDR of "10" can represent bits 64-95 of the key. ADDR of "11" can represent bits 96-127 of the key. Different number of bits can be used for ADDR generation to point to different portions of the key.

In addition, the rotate-bit can be used to indicate whether the selected portion of the 128-bit key should be rotated. For example, the rotate-bit set to 1 can be used as a flag to indicate that the selected portion of the 128-bit should be rotated (e.g., [0:31] can be rotated as [31:0]). Below is an example of a pseudo code for using the rotate-bit to rotate the bits of the selected portion of the 128-bit key.

If (rotate=1) {
   Case use_address[1:0] {
     "00": data_on_pins=data xor encryption_key[31:0]
     "01": data_on_pins=data xor encryption_key[63:32]
     "10": data_on_pins=data xor encryption_key[95:64]
     "11": data_on_pins=data xor encryption_key[127:96]
   }
} else {
//rotate=0
   Case use_address[1:0] {
     "00": data_on_pins=data xor encryption_key[0:31]
     "01": data_on_pins=data xor encryption_key[32:63]
     "10": data_on_pins=data xor encryption_key[64:95]
     "11": data_on_pins=data xor encryption_key[96:127]
   }
}

Decoding (e.g., descrambling) the data read from the external memory 280 can include operations that are opposite or inverse of the encoding (e.g., scrambling) process performed on the write data. The same key and address used to encode (e.g., scramble) the data is used to decode (e.g., descramble) the read data. The read address information can be used to recreate the use_address which points to the correct portion of the key.

FIG. 5 is a diagram showing an exemplary process 500 of decoding the encoded read data. Encoded (e.g., scrambled) data 508 read from the external memory can be decoded (e.g., descrambled) by performing reverse XOR operations with the encoded (e.g., scrambled) data 508 and the decoding key 504. The raw data (e.g., descrambled) 510 shows the result of the reverse XOR operation. Above the decoding key 504, the corresponding bit numbers 502 are shown. Similarly, above the encoded (e.g., scrambled) data, the corresponding bit numbers 506 are shown.

Figure 6A:
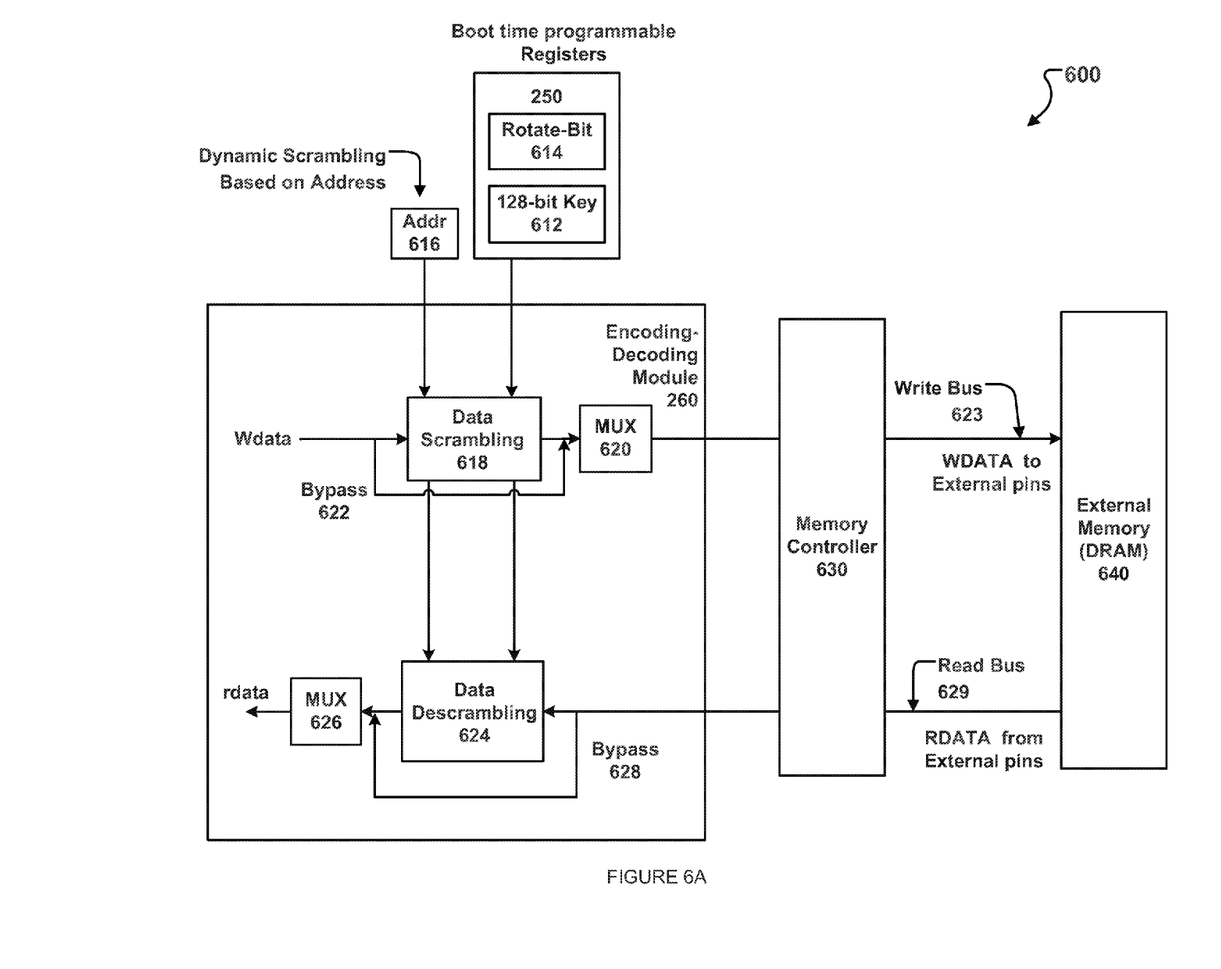
FIGS. 6A, 6B and 6C are block diagrams showing exemplary implementations of an encoding-decoding module within a SOC.

FIG. 6A is a block diagram showing an exemplary implementation 600 of an encoding-decoding module. An encoding-decoding module 260 can include a data scrambling unit 618 that receives Wdata from a processor (not shown). Also, the data scrambling unit 618 can receive a 128-bit key 612 and a rotate-bit 614 from a register module 250. Additionally, the data scrambling unit 618 can receive an address of the received Wdata from a register, such as boot-time programmable registers (e.g., part of register module 250). The received address can be used to dynamically generated use_address pointer (ADDR) 616 that points to or identifies a portion or proper subset of the key. The data scrambling unit 618 can dynamically scramble the received Wdata based on the dynamically generated use_address pointer 616 as described with respect to FIGS. 1-4 above. For example, the data scrambling unit 618 performs XOR operations with the Wdata and the portion of the key identified by the use_address. A result of the XOR operations can include WDATA, an encoded (e.g., scrambled) version of Wdata.

In the example shown in FIG. 6A, the encoded (e.g., scrambled) WDATA is sent to a memory controller 630 located between the encoding-decoding module 260 and the external memory 640. The memory controller 630 can write the encoded (e.g., scrambled) WDATA onto the external memory 640 over a write bus 623. In some implementations, the encoded (e.g., scrambled) WDATA can flow thorough a multiplexer (MUX) 620 before arriving at the memory controller 630.

In addition to the data encoding (e.g., scrambling) path described above, a bypass path 622 can be provided to bypass or disable the encoding-decoding mechanism (e.g., the data scrambling unit 618). The Wdata can flow through the bypass path 622 when a disable code is received from a security module for debugging purposes. The disable option can be available either through a test path or a fuse path.

Similarly, the encoded (e.g., scrambled) read data (RDATA) received from the external memory 640 through a read bus 629 can be decoded (e.g., descrambled) by a data descrambling unit 624 in the encoding-decoding module 260. To descramble the received RDATA, the same key, rotate-bit and address information used to scramble the same data are used. In some implementations, the descrambled data can flow through a multiplexer 626 before sending to a processor.

In addition, a bypass path 628 can be provided to bypass or disable the encoding-decoding mechanism (e.g., the data descrambling unit 624). The Rdata can flow through the bypass path 628 when a disable code is received from a security module for debugging purposes. The disable option can be available either through a test path or a fuse path. Note that the bypass path 628 and the bypass path 622 can be merged such that a single action or input causes both bypass paths 622, 628 to be activated.

Figure 6B:
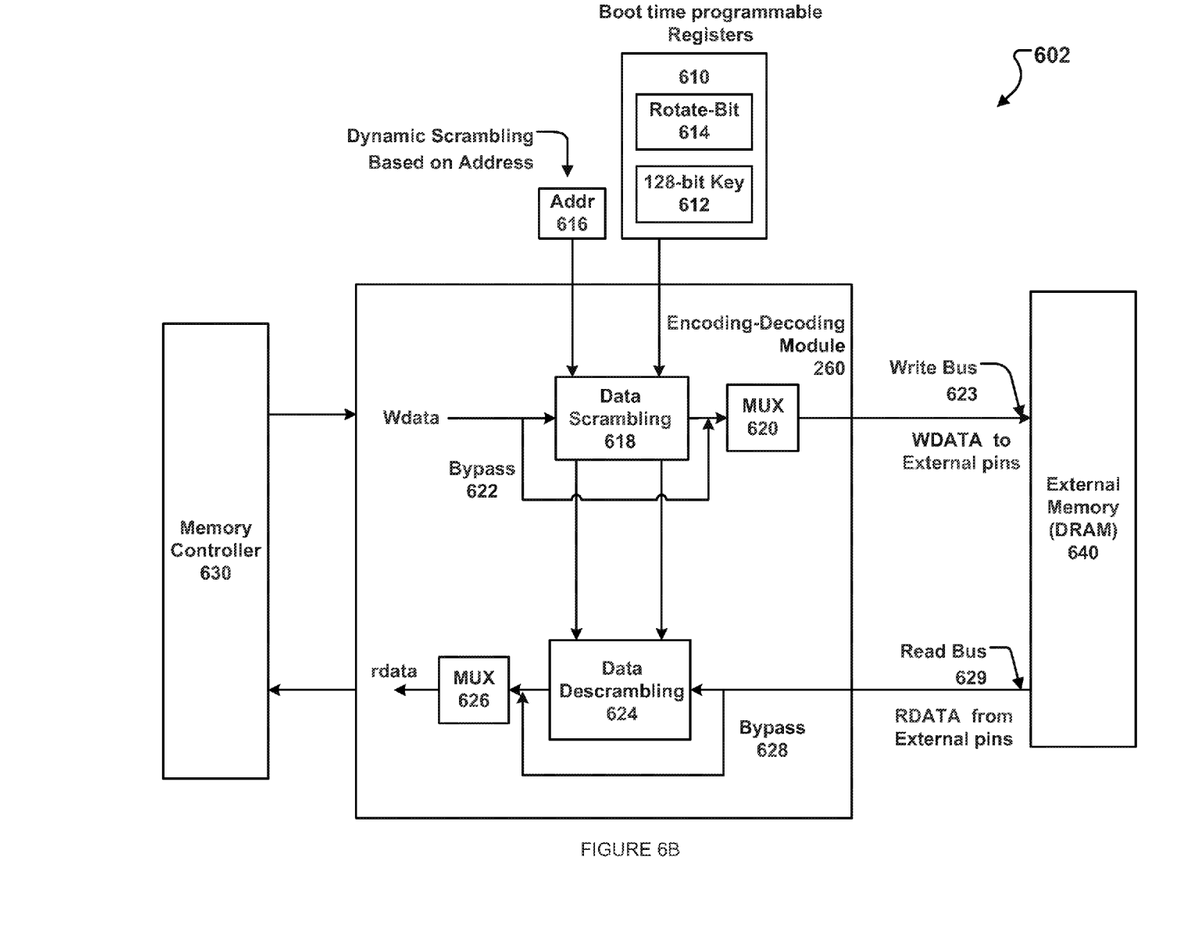

FIG. 6B is a block diagram showing another implementation 602 of an encoding-decoding module 260. In the example shown in FIG. 6B, the encoding-decoding module 260 is positioned after the memory controller 630. Thus, the encoding-decoding module 260 can communicate with the external memory 640 directly to write and read data to and from the external memory 640.

Figure 6C:
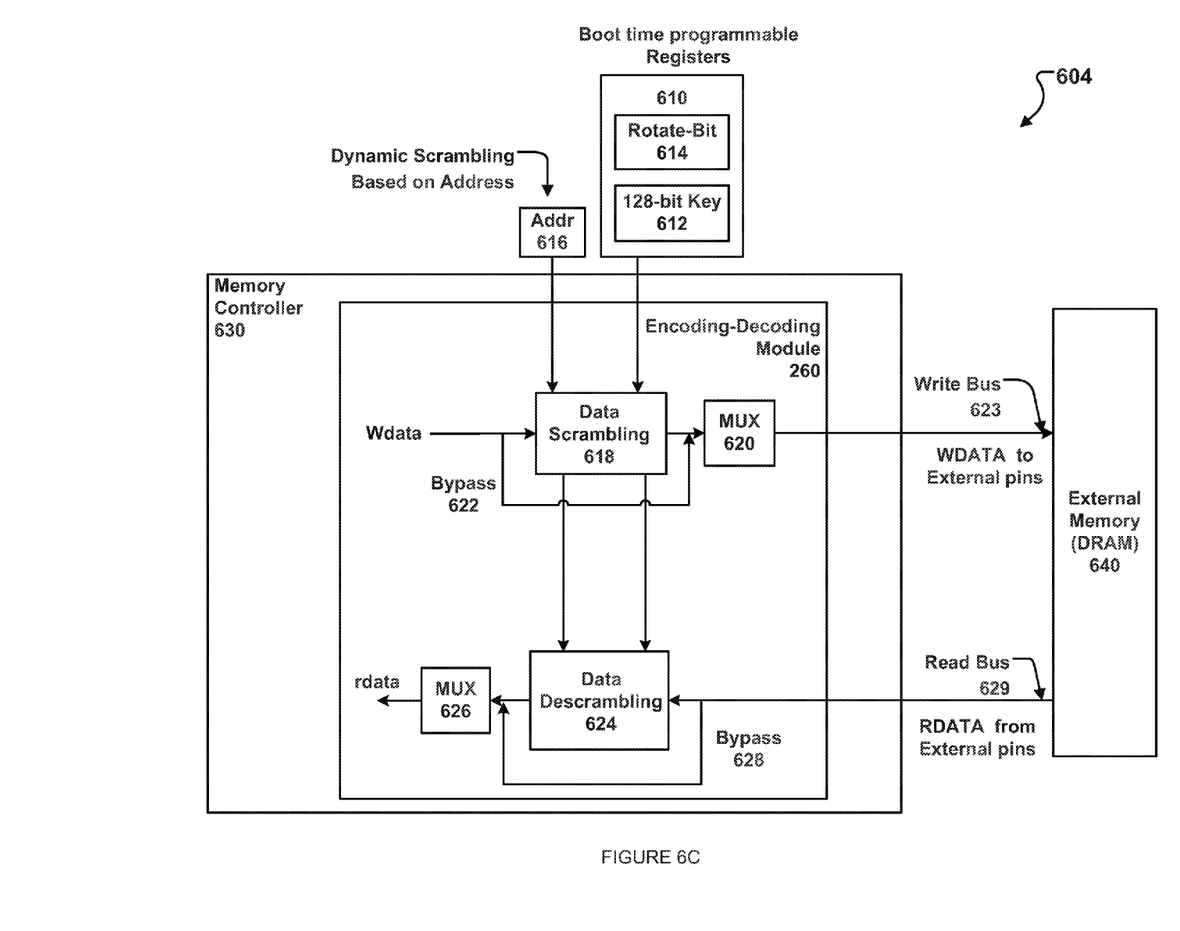

FIG. 6C is a block diagram showing yet another implementation 604 of an encoding-decoding module 260. In the example shown in FIG. 6C, the encoding-decoding module 260 is positioned within the memory controller 630.

A few embodiments have been described in detail above, and various modifications are possible. For example, an entry into a low-power mode that does not cause the external memory to reset can preserve the contents of the 128-bit key and rotate-bit. When the SOC is reset or powered-down, the external memory should also be reset. A fuse or test mechanism can be provided to bypass the encoding-decoding algorithm. When a SOC includes multiple memory controllers, the same 128-bit key or different keys can be used for each of the memory controllers. Encoding data on the external pins of the external memory may be possible for memory controllers with or without embedded direct-memory-access (DMA). The described encoding mechanism can provide an automated data pin encoding (e.g., scrambling) mechanism to solve various security concerns.

The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method performed by a system on a chip (SOC), the method comprising:
   obtaining a key and a flag;
   identifying a proper subset of the key;
   selectively modifying the proper subset of the key responsive to the flag;

receiving data to be output to a memory external to the SOC;

scrambling the received data using the proper subset of the key; and outputting the scrambled data to the memory external to the SOC.

2. The method of claim 1, comprising repeating the identifying for every write and read to change which part of the key is used as the proper subset based on address information associated with the received data.

3. The method of claim 1, wherein obtaining the key and the flag comprises generating the key and the flag during a boot sequence of the SOC, before access to the memory external to the SOC, and the key and the flag are not accessible for read or write via software once generated.

4. The method of claim 1, wherein the key is a 128 bit encryption key, and the flag is a rotate bit.

5. The method of claim 1, wherein selectively modifying the proper subset of the key comprises rotating a bit sequence of the proper subset after identification of the proper subset.

6. The method of claim 1, wherein selectively modifying the proper subset of the key comprises rotating a bit sequence of the key before identification of the proper subset.

7. A system comprising:
a processor in a system on a chip (SOC);
a bus coupled with the processor and internal to the SOC;
a memory controller in the SOC coupled with the bus;
external data pins coupled with the memory controller; and
a module configured to obtain a key and a flag, identify a proper subset of the key, selectively modify the proper subset of the key responsive to the flag, receive data to be output via the external data pins, and scramble the received data using the proper subset of the key before the received data is output on the external data pins.

8. The system of claim 7, wherein the module is included in the memory controller, and the memory controller uses the bus for device register accesses or commands, which are handled differently than data transfers.

9. The system of claim 7, wherein the SOC includes a boot time programmable register module configured to store the key such that the key is not accessible by the processor.

10. The system of claim 7, wherein the module is configured to selectively modify the proper subset of the key by rotating a bit sequence of the proper subset after identification of the proper subset.

11. The system of claim 7, wherein the module is configured to selectively modify the proper subset of the key by rotating a bit sequence of the key before identification of the proper subset.

12. The system of claim 7, further comprising a memory external to the SOC and coupled with the external data pins via an external bus.

13. A method performed by a system on a chip (SOC), the method comprising:
obtaining a key;
receiving data to be output to a memory external to the SOC;
dynamically identifying different portions of the key;

scrambling the received data using the dynamically identified different portions of the key; and outputting the scrambled data to the memory external to the SOC;

wherein dynamically identifying different portions of the key comprises dynamically generating a use_address for the key based on address information associated with the received data; and wherein dynamically generating the use_address comprises XORing different portions of the address information associated with the received data.

14. The method of claim 13, wherein dynamically identifying different portions of the key comprises identifying different ¼ portions of the key.

15. The method of claim 13, wherein the use_address is two bits, and the XORing comprises performing a first XOR operation on two bits of the address information to produce a first bit of the two bits of the use_address, and performing a second XOR operation on two different bits of the address information to produce a second bit of the two bits of the use_address.

16. The method of claim 13, comprising selectively rotating bits of the key indicated by the use_address responsive to a rotate bit.

17. A device comprising:
circuitry configure to obtain a key within a system on a chip (SOC);
circuitry configured to receive data to be output to a memory external to the SOC;
circuitry configured to dynamically identify different portions of the key; and
circuitry configured to scramble the received data using the dynamically identified different portions of the key before the received data is output from the SOC to the memory external to the SOC;
wherein the circuitry configured to dynamically identify different portions of the key comprises circuitry configured to dynamically generate a use_address for the key based on address information associated with the received data; and
wherein the circuitry configured to dynamically generate the use_address comprises circuitry configured to XOR different portions of the address information associated with the received data.

18. The device of claim 17, wherein the circuitry configured to dynamically identify different portions of the key comprises circuitry configured to identify different ¼ portions of the key.

19. The device of claim 17, wherein the use_address is two bits, and the circuitry configured to XOR performs a first XOR operation on two bits of the address information to produce a first bit of the two bits of the use_address, and performs a second XOR operation on two different bits of the address information to produce a second bit of the two bits of the use_address.

20. The device of claim 17, comprising circuitry configured to provide a rotate bit to cause selective rotation of bits of the key indicated by the use_address.

* * * * *